United States Patent
Ni et al.

(10) Patent No.: US 9,693,292 B2
(45) Date of Patent: Jun. 27, 2017

(54) METHOD FOR SEARCHING NETWORK AT STARTUP, COMMUNICATION PROCESSOR AND TERMINAL EQUIPMENT

(71) Applicant: Spreadtrum Communications (Shanghai) Co., Ltd., Zhangjiang, Shanghai (CN)

(72) Inventors: Jinjin Ni, Shanghai (CN); Yi Liu, Shanghai (CN); Fengting Xue, Shanghai (CN); Ping Jiang, Shanghai (CN); Yi Jin, Shanghai (CN); Peng Zhao, Shanghai (CN); Shengjian Wang, Shanghai (CN); Xichun Gao, Shanghai (CN); Xianliang Chen, Shanghai (CN)

(73) Assignee: SPREADTRUM COMMUNICATIONS (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 14/968,008

(22) Filed: Dec. 14, 2015

(65) Prior Publication Data

US 2016/0183177 A1 Jun. 23, 2016

(30) Foreign Application Priority Data

Dec. 23, 2014 (CN) .......................... 2014 1 0834508

(51) Int. Cl.
*H04W 48/16* (2009.01)

(52) U.S. Cl.
CPC .................................. *H04W 48/16* (2013.01)

(58) Field of Classification Search
CPC . H04W 88/02; H04W 52/0229; H04W 60/04; H04W 72/02; H04W 72/0453; H04W 88/06; H04W 48/16
See application file for complete search history.

(56) References Cited

U.S. PATENT DOCUMENTS

| | | | | |
|---|---|---|---|---|
| 2010/0197301 | A1* | 8/2010 | Islam | .................... H04W 24/00 455/434 |
| 2014/0376392 | A1* | 12/2014 | Hegde | ................... H04W 48/16 370/252 |
| 2015/0049600 | A1* | 2/2015 | Balasubramanian | H04W 76/028 370/216 |
| 2015/0189575 | A1* | 7/2015 | Arora | .................. H04W 84/042 455/434 |

* cited by examiner

*Primary Examiner* — George Eng
*Assistant Examiner* — Jing Gao
(74) *Attorney, Agent, or Firm* — Cantor Colburn LLP

(57) ABSTRACT

A method for searching network at startup, a Communication Processor (CP) and a terminal equipment are provided. The method includes: after the CP is powered on and initialized, determining characteristic information of networks supported by the CP; searching for available networks according to the network characteristic information, and obtaining available network information; and obtaining a network searching instruction transmitted from an Application Processor (AP), and determining a network searching result according to the available network information. The method reduces the time for searching network at startup.

7 Claims, 5 Drawing Sheets

METHOD FOR SEARCHING NETWORK AT STARTUP, COMMUNICATION PROCESSOR AND TERMINAL EQUIPMENT

CROSS-REFERENCE TO RELATED APPLICATIONS

The present application claims priority to Chinese patent application No. 201410834508.1, filed on Dec. 23, 2014, and entitled "METHOD FOR SEARCHING NETWORK AT STARTUP, COMMUNICATION PROCESSOR AND TERMINAL EQUIPMENT", the entire disclosure of which is incorporated herein by reference.

TECHNICAL FIELD

The present disclosure generally relates to network technology, and more particularly, to a method for searching network at startup, a communication processor and a terminal equipment.

BACKGROUND

Startup network search is a process for a terminal equipment automatically searching network at startup. The terminal equipment may be mobile terminals supporting various network standards or a combination thereof. For example, the mobile terminal may be a smart phone, a feature phone, etc, and the network standard may be 2nd-Generation mobile communication technology (2G), 3rd-Generation mobile communication technology (3G), 4th-Generation mobile communication technology (4G), or other following evolution network standards.

The conventional method for searching network at startup generally is based on an architecture including an Application Processor (AP) and a Communication Processor (CP). After the terminal equipment is start up, both the CP and the AP are powered on. After being powered on, the CP waits for receiving a network searching instruction from the AP. After receiving the network searching instruction, the CP searches networks, so as to realize an automatical network search at startup.

However, the conventional method for searching network at startup has a problem. After being powered on, the AP takes a time to loading services programs, and only transmits the network searching instruction after the services programs have been loaded. Thus, there is a waiting time for the AP loading service programs before the CP searching networks, which results a long time for the terminal equipment to search network at startup.

SUMMARY

In embodiments of the present disclosure, a method for searching network at startup, a communication processor and a terminal equipment are provided in order to solve the problem of the conventional network searching method at startup. The problem of the conventional network searching method at startup is that, the method cost a long time to search network at startup because there is a waiting time for the AP loading service programs before the CP searching networks.

In order to solve the above problem, a method for searching network at startup is provided in one embodiment. The method is applied to a Communication Processor (CP) of terminal equipment and includes:

after the CP is powered on and initialized, determining characteristic information of networks supported by the CP;

searching for available networks according to the network characteristic information, and obtaining available network information; and obtaining a network searching instruction transmitted from an Application Processor (AP), and determining a network searching result according to the available network information.

In some embodiments, determining characteristic information of networks supported by the CP includes: determining network standards supported by the CP and frequency bands corresponding to the network standards; and the available network information includes: available frequency points of the frequency bands corresponding to the network standards supported by the CP.

In some embodiments, searching for available networks according to the network characteristic information includes: performing frequency search on the frequency bands corresponding to the network standards supported by the CP, according to a predetermined network standard searching order.

In some embodiments, the network searching result includes a frequency point searching result of each frequency band, and determining a network searching result according to the available network information includes:

when obtaining the network searching instruction transmitted from the AP, if there is a frequency band being searched, determining available frequency points, which are obtained by the CP and are corresponding to the frequency band being searched, as a frequency point searching result of the frequency band being searched;

if there is a frequency band being partly searched, combining partial available frequency point information which is obtained by the CP and is corresponding to the frequency band being partly searched, with frequency point information which is prestored in the terminal equipment and is corresponding to the frequency band being partly searched, so as to obtain combined frequency point information; and determining the combined frequency point information as a frequency point searching result of the frequency band being partly searched; and if there is a frequency band being unsearched, determining frequency point information which is prestored in the terminal equipment and is corresponding to the frequency band being unsearched as a frequency point searching result of the frequency band being unsearched.

In some embodiments, the method further includes: performing network registration according to the network searching result.

In some embodiments, performing network registration according to the network searching result includes:

for any network standard supported by the CP, performing cell search by using the frequency point searching result of the frequency band being searched and/or the frequency point searching result of the frequency band being partly searched;

if no cell is found and there are unsearched frequency bands and/or frequency bands being partly searched under the network standard, performing frequency search on the unsearched frequency bands and/or the frequency bands being partly searched, so as to perform cell search according to frequency points obtained by the frequency search; and if no cell is found and there are no unsearched frequency bands and/or frequency bands being partly searched under the network standard, performing cell search under next network standard.

A communication processor is also provided in embodiments of the present disclosure. In one embodiment, the communication processor includes a device for searching network at startup, and the device for searching network at startup includes:

a network characteristic determination module adapted for, after the CP is powered on and initialized, determining characteristic information of networks supported by the CP;

a network searching module adapted for searching for available networks according to the network characteristic information, and obtaining available network information; and a searching result determination module adapted for obtaining a network searching instruction transmitted from an Application Processor (AP), and determining a network searching result according to the available network information.

In some embodiments, the available network information includes: available frequency points of the frequency bands corresponding to the network standards supported by the CP;

wherein the network characteristic determination module includes: a standard and frequency band determination unit adapted for determining network standards supported by the CP and frequency bands corresponding to the network standards; and wherein the network searching module includes: a network searching unit adapted for performing frequency search on the frequency bands corresponding to the network standards supported by the CP, according to a predetermined network standard searching order; and wherein the searching result determination module includes:

a first result determination unit adapted for, when obtaining the network searching instruction transmitted from the AP, if there is a frequency band being searched, determining available frequency points, which are obtained by the CP and are corresponding to the frequency band being searched, as a frequency point searching result of the frequency band being searched;

a second result determination unit adapted for, if there is a frequency band being partly searched, combining partial available frequency point information which is obtained by the CP and is corresponding to the frequency band being partly searched, with frequency point information which is prestored in the terminal equipment and is corresponding to the frequency band being partly searched, so as to obtain combined frequency point information; and determining the combined frequency point information as a frequency point searching result of the frequency band being partly searched; and a third result determination unit adapted for, if there is a frequency band being unsearched, determining frequency point information which is prestored in the terminal equipment and is corresponding to the frequency band being unsearched as a frequency point searching result of the frequency band being unsearched.

In some embodiments, the device for searching network at startup further includes: a network registration module adapted for performing network registration according to the network searching result;

wherein the network registration module includes:

a cell searching unit adapted for, performing cell search for any network standard supported by the CP, by using the frequency point searching result of the frequency band being searched and/or the frequency point searching result of the frequency band being partly searched;

a continual frequency searching unit adapted for, if no cell is found and there are unsearched frequency bands and/or frequency bands being partly searched under the network standard, performing frequency search on the unsearched frequency bands and/or the frequency bands being partly searched, so as to perform cell search according to frequency points obtained by the frequency search; and a next-step searching unit adapted for, if no cell is found and there are no unsearched frequency bands and/or frequency bands being partly searched under the network standard, performing cell search under next network standard.

A terminal equipment is also provided in embodiments of the present disclosure. The terminal equipment include an application processor and the communication processor described above.

In the method for searching network at startup according to embodiments of the present disclosure, after the CP is powered on and initialized, characteristic information of networks supported by the CP can be determined, then available networks is searched for according to the network characteristic information and available network information is obtained, and then, after obtaining a network searching instruction transmitted from the AP, a network searching result can be determined according to the available network information. From above, it can been seen that, the CP can search available networks according to network characteristic information, in a time period from the CP being powered on and initialized to the CP obtaining the network searching instructions transmitted from the AP. Thus, after receiving the network searching instructions transmitted from the AP, the CP can determine the network search result according to obtained information of the available networks. Therefore, a time for searching network at startup is reduced, the process for searching network at startup can be performed quickly, and an efficiency of searching network at startup is improved.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Embodiments of the present disclosure will be described in detail hereunder in conjunction with the accompanying drawings. It is obvious that these embodiments are only a part, but not all of this disclosure. According to embodiments of the present disclosure, those skilled in the art can modify and vary these embodiments without departing from the spirit and scope of the present disclosure.

Inventors of the present disclosure found that, after the CP is powered on and initialized, there is a waiting time for the AP to load service program and send a network searching instruction, such that the CP can utilize this waiting time to perform frequency search according to network standards supported by itself and frequency bands corresponding to network standards; and then, when the AP transmits the network searching instruction, the CP can determine a network searching result according to the searching result, which results in a reduction of the network searching time at startup. Based on this idea, a method for searching network at startup will be provided in embodiments of the present disclosure.

Figure 1:
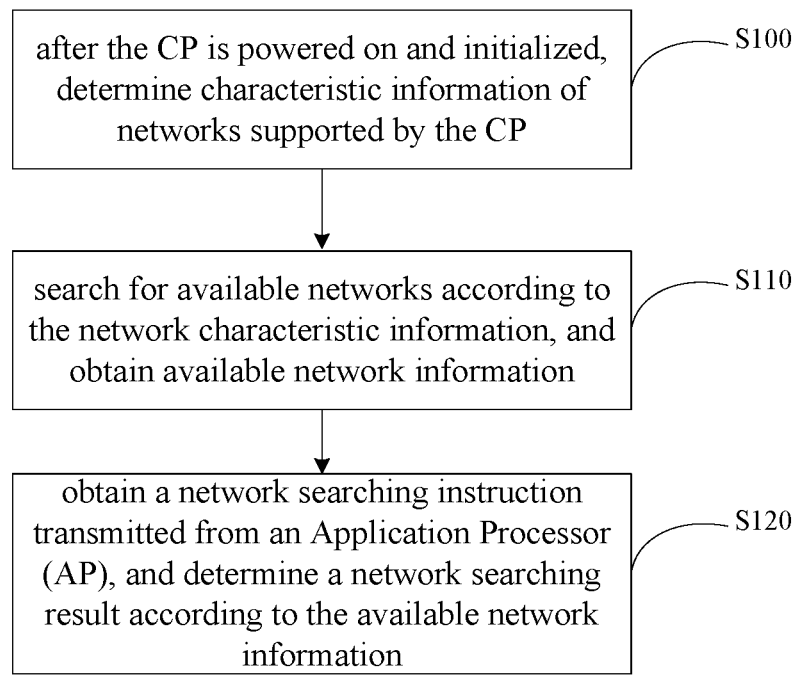
FIG. 1 schematically illustrates a flow chart of a method for searching network at startup according to one embodiment of the present disclosure.

FIG. 1 illustrates a flow chart of a method for searching network at startup according to one embodiment of the present disclosure. Referring to FIG. 1, the method may include Step S100, Step S110 and Step S120.

In Step S100, after a CP is powered on an initialized, determining characteristic information of networks supported by the CP;

Optionally, the network characteristic information is a basis for the CP to search network, and may be network standards supported by the CP and frequency bands corresponding to network standards;

Taking an existing mobile phone as an example, the mobile phone may support 4G, 3G and 2G network standards simultaneously, and can communicate on frequency bands corresponding to the 4G network standard, frequency bands corresponding to the 3G network standard and frequency bands corresponding to the 2G network standard. Therefore, the 4G network standard and its corresponding frequency bands, the 3G network standard and its corresponding frequency bands, and the 2G network standard and its corresponding frequency bands are network characteristic information of this mobile phone. Obviously, the above description is only an example, the network standards and their corresponding frequency bands in this disclosure may further include following evolution network standards and their corresponding frequency bands. That is, the network standard and its corresponding frequency bands may include at least one of the 4G network standard and its corresponding frequency bands, the 3G network standard and its corresponding frequency bands, the 2G network standard and its corresponding frequency bands, and the following evolution network standards and their corresponding frequency bands.

In Step S110, search for available networks according to the network characteristic information, so as to obtain network characteristic information.

Optionally, the CP may perform frequency search on frequency bands corresponding to the network standards supported by the CP itself. Available frequency points of each frequency band in the frequency search result are available network information of corresponding frequency band.

In Step S120, obtain a network searching instruction transmitted by an AP, and obtain a network searching result according to the available network information.

Optionally, the AP may transmit the network searching instruction to the CP after service programs being loaded, such that the CP can obtain the network searching instruction transmitted by the AP. Optionally, the available network information obtained by the CP can be used as the network searching result directly, or can be used as the network searching result in conjunction with available network information prestored in Subscriber Identity Module SIM) or Universal Subscriber Identity Module (USIM).

In the method for searching network at startup according to embodiments of the present disclosure, after the CP is powered on and initialized, the characteristic information of networks supported by the CP can be determined, such that available networks is searched according to the network characteristic information, so as to obtain the available network information; and then, when the CP obtained the network searching instructions transmitted by the AP, the network searching result can be determined based on the available network information. From above, in the method for searching network at startup according to embodiments of this disclosure, in a time period from the CP being powered on and initialized to the CP obtaining the network searching instructions transmitted from the AP, the CP can searching available networks according to the network characteristic information, such that the CP can determine the network searching result according to the available network information obtained in prior steps. Therefore, a time for searching network at startup is reduced, the process for searching network at startup can be performed quickly, and an efficiency of searching network at startup is improved.

Optionally, the CP supports at least one network standard. The method in embodiments of the present disclosure can search frequency bands corresponding to the network standards supported by the CP, in a predetermined network standard searching order, so as to obtain available frequency points on the searched frequency bands.

Specifically, the CP may support only one network standard. The predetermined network standard searching order may be searching network under this network standard, and the frequency search is performed on a frequency band corresponding to this network standard, so as to obtain an available frequency point on the searched frequency band. For example, for a feature mobile phone which only supports 2G network, the CP can search on frequency bands corresponding to the 2G network, and obtain available frequency points of the frequency bands corresponding to the 2G network.

If the CP supports more than one network standard, the CP can perform network searching according to generations of the more than one network standards, from example, from the highest generation to the low generation, or from the lowest generation to the highest generation, so as to search frequency bands corresponding to the more than one network standard and obtain available frequency points on the searched frequency bands. For example, for a mobile phone supporting 2G, 3G and 4G network standards, the searching order can be predetermined as the priority of the network standards from high generation to low generation. That is, the frequency search is firstly performed on frequency bands corresponding to 4G network, then the frequency search is performed on frequency bands corresponding to 3G network, and then the frequency search is performed on frequency bands corresponding to 2G network. Obviously, in other embodiments, the searching order may be the priority of the network standards from low generation to high generation.

A mobile phone, which supports network standards and their corresponding network bands of TD-LTE band 38, 39, 40; TD-SCDMA band 34, 39; and GSM 900, 1800, is taken as an example. According to a searching order determined based on priorities from high generation to low generation of the networks, the CP may firstly perform frequency search on the 38 frequency band (2570 MHz-2620 MHz), the 39 frequency band (1880 MHz-1920 MHz) and the 40 frequency band (2300 MHz-2400 MHz) of the TD-LTE network, so as to obtain available frequency points (for example, a frequency point of 2570 MHz, etc.) corresponding to the 38 frequency band, available frequency points corresponding to the 39 frequency band, and available frequency points corresponding to the 40 frequency band. Then the CP may perform frequency search on the 34 frequency band and the 39 frequency band of the TD-SCDMA network, so as to obtain available frequency points corresponding to the 34 frequency band, and available frequency points corresponding to the 39 frequency band. At last, the CP may perform frequency search on the 900 frequency band and the 1800 frequency band of the GSM network, so as to obtain available frequency points corresponding to the 900 frequency band, and available frequency points corresponding to the 1800 frequency band.

Optionally, after the CP obtained the network searching instruction transmitted from the AP, frequency search performed by the CP may be in one of the following conditions:

all the frequency bands corresponding to the network standard having been searched;

a part of the frequency bands corresponding to the network standard having been searched, and the other part having not been searched;

a first part of the frequency bands corresponding to the network standard having been searched, a second part having been partly searched, and the rest part having not been searched.

Therefore, the searching conditions of the network bands corresponding to network standards supported by the CP can be divided into following types: frequency bands being searched, frequency bands being partly searched, and frequency bands being unsearched.

For the frequency bands being searched, the available frequency points obtained by the frequency search can be used as the frequency searching result of the frequency bands being searched.

For the frequency bands being partly searched, partial available frequency point information, obtained by frequency search of the CP, can be combined with a pre-stored frequency point information corresponding to the frequency bands being partly searched, and the combined frequency point information can be used as the frequency searching result of the frequency bands being partly searched. Optionally, the combining method may include: performing a conjunction operation of the partial available frequency point information obtained by frequency search of the CP and the pre-stored frequency point information corresponding to the frequency bands; and performing a deduplication operation on frequency points obtained in above steps.

For the frequency bands being unsearched, a pre-stored available frequency point information corresponding to the frequency bands being unsearched can be used as the frequency searching result of the frequency bands being unsearched.

In embodiments of the present disclosure, the network searching result includes frequency point searching results of each frequency band. The frequency point searching results are determined by the above method according to frequency searching conditions of the frequency bands.

For example, network standards and their corresponding frequency bands supported by the CP are TD-LTE band 38, 39 and 40. After the CP obtained the network work searching instruction, the frequency band of TD-LTE band 38 has been searched, the frequency band 39 has been partly searched (for example, only 1880 MHZ-1900 MHZ have been searched in the band 1880 MHZ-1920 H), and the frequency band 40 has not been searched. Then, for the frequency band of TD-LTE 38, available frequency points obtained by the frequency search can be used as the frequency searching result of the frequency band of TD-LTE 38, so that network registration can be performed and cell search can be obtained on the frequency band of TD-LTE 38 in subsequent steps. For the frequency band of TD-LTE 39, a part of available frequency point information obtained by frequency search of the CP, and an available frequency point information about the frequency band of TD-LTE 39 which is pre-stored in a SIM/USIM card of the terminal equipment, are combined to serve as the frequency searching result of the frequency band of TD-LTE 39, so that network registration can be performed and cell search can be achieved on the frequency band of TD-LTE 39 in subsequent steps. For the frequency band of TD-LTE 40, an available frequency point information about the frequency band of TD-LTE 40 which is prestored in a SIM/USIM card of the terminal equipment is used as the frequency searching result of the frequency band of TD-LTE 40, so that network registration can be performed and cell search can be obtained on the frequency band of TD-LTE 40 in subsequent steps.

Figure 2:
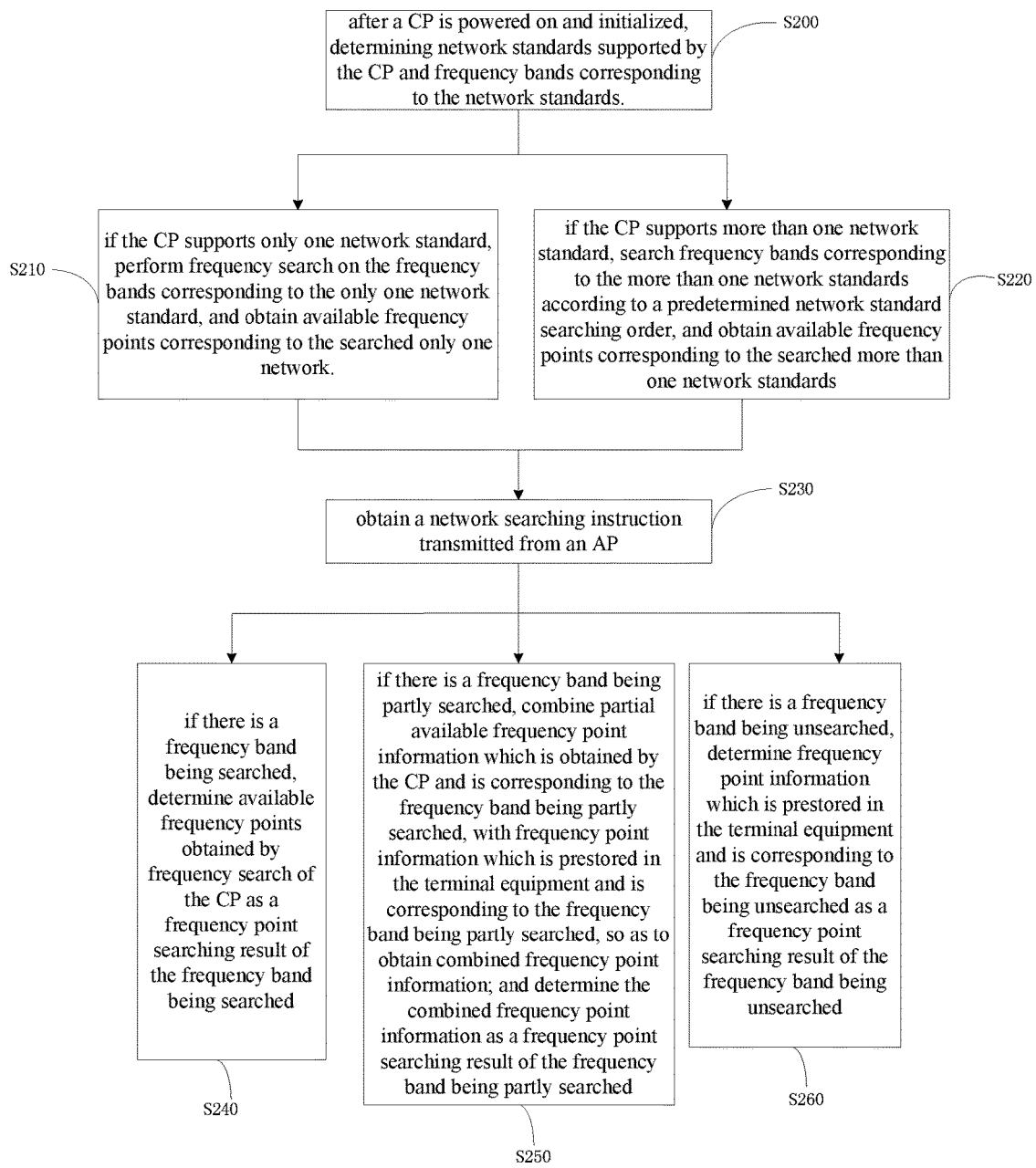
FIG. 2 schematically illustrates a flow chart of a method for searching network at startup according to another embodiment of the present disclosure.

A flow chart of a method for searching network at startup is illustrated in FIG. 2 according to another embodiment of the present disclosure. Referring to FIG. 2, the method may include Steps S200-S260.

In Step S200, after a CP is powered on and initialized, determining network standards supported by the CP and frequency bands corresponding to the network standards.

In Step S210, if the CP supports only one network standard, perform frequency search on the frequency bands corresponding to the only one network standard, and obtain available frequency points corresponding to the searched only one network.

In Step S220, if the CP supports more than one network standard, search frequency bands corresponding to the more than one network standards according to a predetermined network standard searching order, and obtain available frequency points corresponding to the searched more than one network standards.

Optionally, Step S210 and Step 220 are different steps when the CP supports different numbers of network standard. In an actual implementation, only one of Step S210 and Step S220 can be performed.

In Step S230, obtain a network searching instruction transmitted from an AP.

In Step S240, if there is a frequency band being searched, determine available frequency points obtained by frequency search of the CP as a frequency point searching result of the frequency band being searched.

In Step S250, if there is a frequency band being partly searched, combine partial available frequency point information which is obtained by the CP and is corresponding to the frequency band being partly searched, with frequency point information which is pre-stored in the terminal equipment and is corresponding to the frequency band being partly searched, so as to obtain combined frequency point information; and determine the combined frequency point information as a frequency point searching result of the frequency band being partly searched.

Optionally, a SIM/USIM card may be used to prestore frequency point information of frequency bands corresponding to each network standard. For the frequency bands being partly searched under network standards supported by the CP, the available frequency point information, which is pre-stored in the SIM/USIM card and is corresponding to the frequency bands under the corresponding network standard, can be used as a frequency searching result of the frequency bands being partly searched.

In Step S260, if there is a frequency band being unsearched, determine frequency point information which is pre-stored in the terminal equipment and is corresponding to the frequency band being unsearched as a frequency point searching result of the frequency band being unsearched.

It should be noted that, as described above, the operation of frequency search may be in: a condition of all the frequency bands corresponding to the network standard having been searched, or a condition of a part of the frequency bands corresponding to the network standard having been searched, and the other part having not been searched; or a condition of a first part of the frequency bands corresponding to the network standard having been searched, a second part having been partly searched, and the rest part having not been searched. Therefore, in the method shown in FIG. 2, in some embodiments, Step 240, Step 250 and Step 260 may exist at a same time. That is, a part of the frequency bands corresponding to the network standard has been searched, another part has partly been searched, and another part has not been searched. In some embodiments, only step 240 exists, that is, all frequency bands corresponding to the network standard has been searched. In some embodiments, only Step 240 and Step S260 exist, that is, a part of the frequency bands corresponding to the network standard has been searched, another part has partly been searched. Certainly, in some embodiments, only Step 240 and Step S250 exist.

Optionally, after the network searching result being obtained, embodiments of the present disclosure can perform network registration and achieve cell search.

Figure 3:
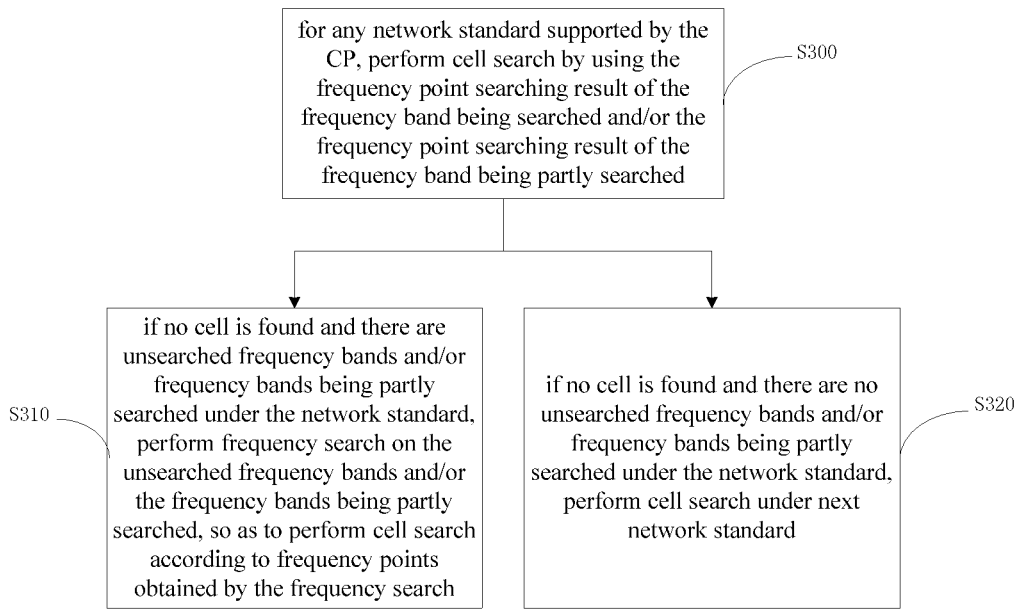
FIG. 3 schematically illustrates a flow chart of a method for network registration according to a network searching result.

FIG. 3 illustrates a flow chart for performing network registration according to the network searching result. Referring to FIG. 3, the method may include Steps S300, S310 and S320.

In Step S300, for any network standard supported by the CP, perform cell search by using the frequency point searching result of the frequency band being searched and/or the frequency point searching result of the frequency band being partly searched.

In Step 310, if no cell is found and there are unsearched frequency bands and/or frequency bands being partly searched under the network standard, perform frequency search on the unsearched frequency bands and/or the frequency bands being partly searched, so as to perform cell search according to frequency points obtained by the frequency search.

In Step 320, if no cell is found and there are no unsearched frequency bands and/or frequency bands being partly searched under the network standard, perform cell search under next network standard.

In embodiments of the present disclosure, when the network registration is performed under each network standard, the frequency point search result of the frequency bands being searched under each network standard, and the frequency point search result of the frequency bands being partly searched under each network standard are preferentially used. Optionally, the network registration may be performed by using only the frequency point search result of the frequency bands being searched under each network standard, or only the frequency point search result of the frequency bands being partly searched under each network standard.

When the network registration is performed under a network standard, if no cell is found according to the frequency point search result of the frequency bands being searched under the network standard and the frequency point search result of the frequency bands being partly searched under the network standard, and there are unsearched frequency bands under the network standard, the method in embodiments of the present disclosure may perform frequency search on the unsearched frequency bands, so as to perform cell search according to available frequency points obtained by the frequency search. Obviously, in other embodiments, if no cell is found according to the frequency point search result of the frequency bands being searched under the network standard and the frequency point search result of the frequency bands being partly searched under the network standard, the method in embodiments of the present disclosure may perform frequency search on the partly searched frequency band, so as to perform cell search according to available frequency points obtained by the frequency search.

If all the frequency bands under the network standard have been searched, the cell search may be performed under next network standard. The network search under the next network standard is similar to the search process described above.

In order to facilitate understanding of the present disclosure, the CP supporting the network standard and its corresponding frequency bands of TD-LTE band 38, 39, 40 is taken as an example. After the CP has obtained the search instruction transmitted from the AP, the frequency band of TD-LTE band 38 has been searched, the frequency band 39 has been partly searched, and the frequency band 40 has not been searched. In a process for performing network registration, the cell search can be performed by using the frequency point searching result of the frequency band 38 (namely, the available frequency point obtained by searching the frequency band 38) and the frequency point searching result of the frequency band 39 (namely, a combination of the available frequency point obtained by partly searching the frequency band 38 and the frequency point information which is corresponding to the frequency band of TD-LTE 39 and pre-stored in a SIM/USIM card). If a cell is found, the cell search process is finished. If no cell is found, a frequency search is performed on the unsearched part of the frequency band 39 and the frequency band 40, and then a cell search is performed according to available frequency points obtained by the frequency search. If a cell is found, the cell search process is finished. If no cell is found, frequency search is performed under another network standard (for example, performing cell search under TD-SCDMA band 34, 39, which is similar to the cell search process described above). If there is no another network standard, the process of cell search is failed.

In the method for searching network at startup provided in embodiments of the present disclosure, the CP can search available networks according to network characteristic information, in a time period from the CP being powered on and initialized to the CP obtaining the network searching instructions transmitted from the AP. Thus, after receiving the network searching instructions transmitted from the AP, the CP can determine the network search result according to obtained information of the available networks. Therefore, a time for searching network at startup is reduced, the process for searching network at startup can be performed quickly, and an efficiency of searching network at startup is improved.

Figure 4:
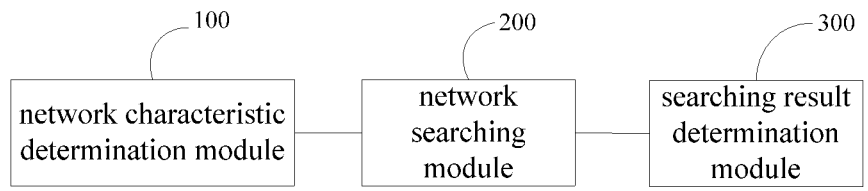
FIG. 4 schematically illustrates a block diagram of a device for searching network at startup according to one embodiment of the present disclosure.

A CP is provided in embodiments of the present disclosure and will be described below. The CP may include a device for searching network at startup. The device for searching network at startup may be corresponding to the method for searching network at startup described above. FIG. 4 illustrates a structure diagram of a device for searching network at startup according to one embodiment of the present disclosure. Referring to FIG. 4, the device for searching network at startup may include:

a network characteristic determination module 100 adapted for, after the CP is powered on and initialized, determining characteristic information of networks supported by the CP;

a network searching module 200 adapted for searching for available networks according to the network characteristic information, and obtaining available network information; and a searching result determination module 300 adapted for obtaining a network searching instruction transmitted from an Application Processor (AP), and determining a network searching result according to the available network information.

Figure 5:
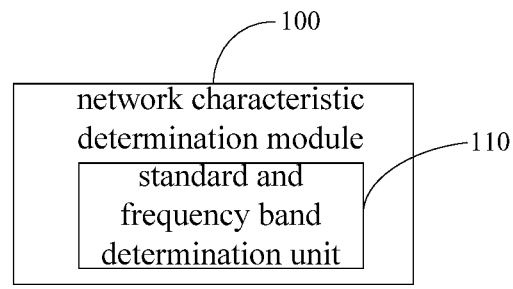
FIG. 5 schematically illustrates a block diagram of a network characteristic determination module according to one embodiment of the present disclosure.

Optionally, FIG. 5 illustrates an optional structure diagram of the network characteristic determination module 100 according to one embodiment of the present disclosure. Referring to FIG. 5, the network characteristic information determination module 100 may include:

a standard and frequency band determination unit 110, adapted for determining network standards supported by the CP, and frequency bands corresponding to the network standards.

Correspondingly, the available network information includes available frequency points of the frequency bands corresponding to the network standard supported by the CP.

Figure 6:
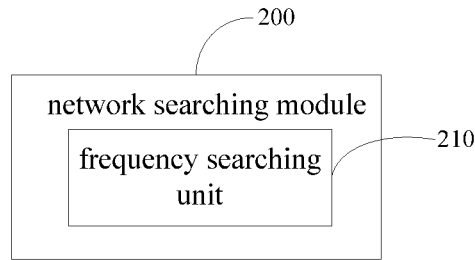
FIG. 6 schematically illustrates a block diagram of a network searching module according to one embodiment of the present disclosure.

FIG. 6 illustrates an optional structure diagram of the network searching module 200 according to one embodiment of the present disclosure. Referring to FIG. 6, the network searching module 200 may include:

a frequency searching unit 210, adapted for performing frequency search on the frequency bands corresponding to the network standards supported by the CP, according to a predetermined network standard searching order.

Figure 7:
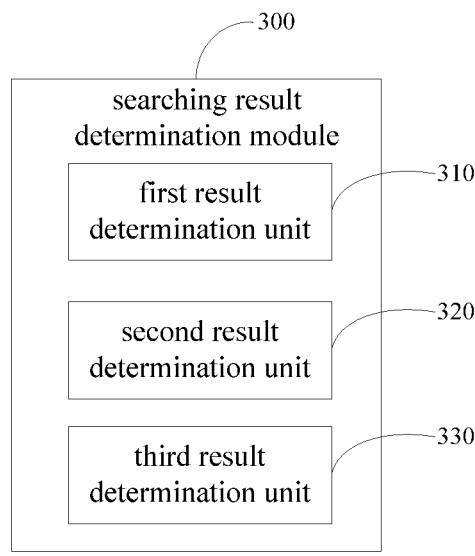
FIG. 7 schematically illustrates a block diagram of a searching result determination module according to one embodiment of the present disclosure.

Optionally, FIG. 7 illustrates an optional structure diagram of the searching result determination module 300 according to one embodiment of the present disclosure. Referring to FIG. 7, the searching result determination module 300 may include:

a first result determination unit 310 adapted for, when obtaining the network searching instruction transmitted from the AP, if there is a frequency band being searched, determining available frequency points, which are obtained by the CP and are corresponding to the frequency band being searched, as a frequency point searching result of the frequency band being searched;

a second result determination unit 310 adapted for, if there is a frequency band being partly searched, combining partial available frequency point information which is obtained by the CP and is corresponding to the frequency band being partly searched, with frequency point information which is pre-stored in the terminal equipment and is corresponding to the frequency band being partly searched, so as to obtain combined frequency point information; and determining the combined frequency point information as a frequency point searching result of the frequency band being partly searched; and a third result determination unit 330 adapted for, if there is a frequency band being unsearched, determining frequency point information which is pre-stored in the terminal equipment and is corresponding to the frequency band being unsearched as a frequency point searching result of the frequency band being unsearched.

Optionally, as shown in FIG. 7, the searching result determination module 300 may only include the first result determination unit 310, or only include the first result determination unit 310 and the third result determination unit 330.

Figure 8:
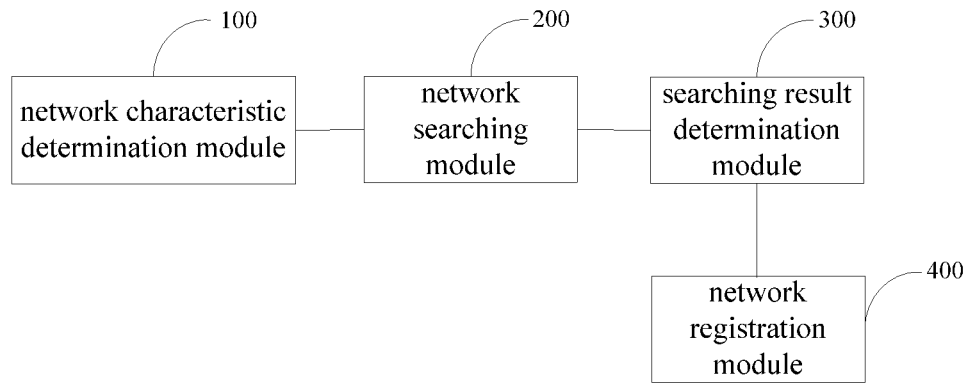
FIG. 8 schematically illustrates a block diagram of a device for searching network at startup according to another embodiment of the present disclosure.

FIG. 8 illustrates a structural diagram of the device for searching network at startup according to another embodiment of the present disclosure. Referring to FIG. 4 and FIG. 8, the device for searching network at startup may further include:

a network registration module 400, adapted for performing network registration according to the network searching result.

Figure 9:
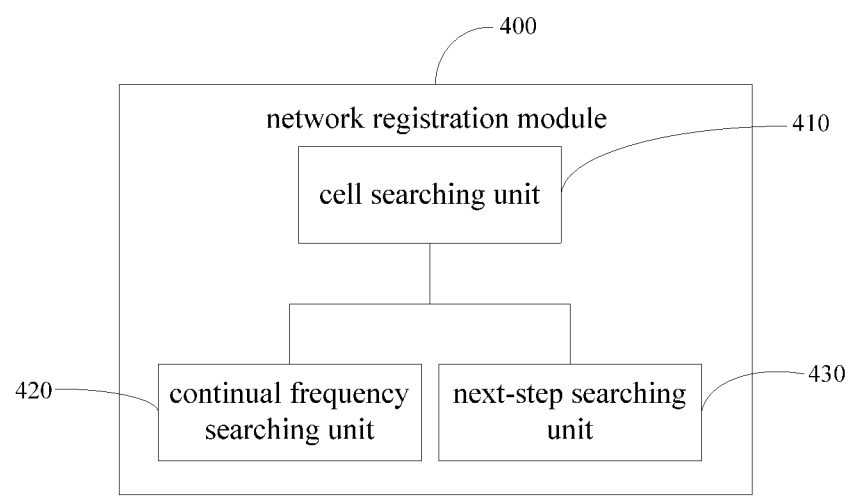
FIG. 9 schematically illustrates a block diagram of a network registration module according to one embodiment of the present disclosure.

Optionally, FIG. 9 illustrates an optional structural diagram of the network registration module 400 according to one embodiment of the present disclosure. Referring to FIG. 9, the network registration module 400 may include:

a cell searching unit 410 adapted for, performing cell search for any network standard supported by the CP, by using the frequency point searching result of the frequency band being searched and/or the frequency point searching result of the frequency band being partly searched;

a continual frequency searching unit 420 adapted for, if no cell is found and there are unsearched frequency bands and/or frequency bands being partly searched under the network standard, performing frequency search on the unsearched frequency bands and/or the frequency bands being partly searched, so as to perform cell search according to frequency points obtained by the frequency search; and a next-step searching unit 430 adapted for, if no cell is found and there are no unsearched frequency bands and/or frequency bands being partly searched under the network standard, performing cell search under next network standard.

Figure 10:
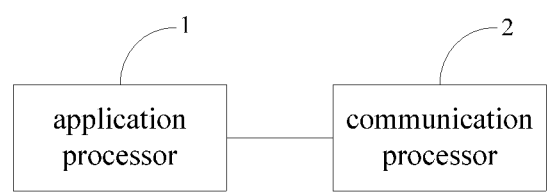
FIG. 10 schematically illustrates a block diagram of a terminal equipment according to one embodiment of the present disclosure.

A terminal equipment is also provided according to an embodiment of the present disclosure. FIG. 10 illustrates a structure diagram of the terminal equipment. Referring to FIG. 10, the terminal equipment may include an application processor 1 and a communication processor 2, wherein the communication process 2 may include the device for searching network at startup described above.

Specifically, the communication device 2 is adapted for: after a CP is powered on an initialized, determining characteristic information of networks supported by the CP; searching for available networks according to the network characteristic information, so as to obtain network characteristic information; obtaining a network searching instruction transmitted by an AP, and obtaining a network searching result according to the available network information.

The application processor 1 is adapted for, after being powered on, loading service programs and sending a network searching instruction to the communication processor 2 after the service programs having been loaded.

In embodiments of the present disclosure, the CP can utilize a time period from the CP being powered on and initialized to the CP obtaining the network searching instructions transmitted from the AP to perform network searching. Therefore, a time for searching network at startup is reduced, the process for searching network at startup can be performed quickly, and an efficiency of searching network at startup is improved.

Embodiments of the present are described in a progressive way. Each embodiment particularly describes its different part with other embodiments. The same part or similar part among these embodiments may refer to one another. As being corresponding to the previous method, the device disclosed in above embodiments is described briefly. More detail about the device may refer to the description of the method.

It can be understood by those skilled in the art that, the various units and algorithm steps described in embodiments of the present disclosure can be implemented by electronic hardware, computer software or a combination thereof. In order to clarify the interchangeability of hardware and software, compositions and procedures of each embodiment has been generally described according to their functions in above description. It is determined by the specific application and design constraints of the technical solution whether the functions are implemented in hardware manner or in software manner. Those skilled in the art may implement the described functions in different manners for each specific application, but it is not believed that there implementations depart from the spirit and scope of the present disclosure.

The method or algorithm disclosed in embodiments of the present disclosure can be directly implemented by hardware, software module executed by a processor, or a combination thereof. The software module can be stored in a Random Access Memory (RAM), an internal memory, a Read Only Memory, an electrically programmable ROM, an electrically erasable and programmable ROM, register, hard disk, removable disk, CD-ROM, or any other well known storage medium to those skilled in the art.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for searching network at startup, which is applied to a Communication Processor (CP) of terminal equipment, comprising:

after the CP is powered on and initialized, determining characteristic information of networks supported by the CP;

searching for available networks according to the network characteristic information, and obtaining available network information; and obtaining a network searching instruction transmitted from an Application Processor (AP), and determining a network searching result according to the available network information;

wherein determining characteristic information of networks supported by the CP comprises: determining network standards supported by the CP and frequency bands corresponding to the network standards;

wherein the available network information comprises: available frequency points of the frequency bands corresponding to the network standards supported by the CP;

wherein searching for available networks according to the network characteristic information comprises: performing frequency search on the frequency bands corresponding to the network standards supported by the CP, according to a predetermined network standard searching order; and wherein the network searching result comprises a frequency point searching result of each frequency band, and wherein determining a network searching result according to the available network information comprises:

when obtaining the network searching instruction transmitted from the AP, if there is a frequency band being searched, determining available frequency points, which are obtained by the CP and are corresponding to the frequency band being searched, as a frequency point searching result of the frequency band being searched;

if there is a frequency band being partly searched, combining partial available frequency point information which is obtained by the CP and is corresponding to the frequency band being partly searched, with frequency point information which is prestored in the terminal equipment and is corresponding to the frequency band being partly searched, so as to obtain combined frequency point information; and determining the combined frequency point information as a frequency point searching result of the frequency band being partly searched; and if there is a frequency band being unsearched, determining frequency point information which is prestored in the terminal equipment and is corresponding to the frequency band being unsearched as a frequency point searching result of the frequency band being unsearched.

2. The method according to claim 1, further comprising: performing network registration according to the network searching result.

3. The method according to claim 2, wherein performing network registration according to the network searching result comprises:

for any network standard supported by the CP, performing cell search by using the frequency point searching result of the frequency band being searched and/or the frequency point searching result of the frequency band being partly searched;

if no cell is found and there are unsearched frequency bands and/or frequency bands being partly searched under the network standard, performing frequency search on the unsearched frequency bands and/or the frequency bands being partly searched, so as to perform cell search according to frequency points obtained by the frequency search; and if no cell is found and there are no unsearched frequency bands and/or frequency bands being partly searched under the network standard, performing cell search under next network standard.

4. A Communication Processor (CP) of a terminal equipment, comprising: a device for searching network at startup, wherein the device for searching network at startup comprises:
  a network characteristic determination module adapted for, after the CP is powered on and initialized, determining characteristic information of networks supported by the CP;
  a network searching module adapted for searching for available networks according to the network characteristic information, and obtaining available network information; and
  a searching result determination module adapted for obtaining a network searching instruction transmitted from an Application Processor (AP), and determining a network searching result according to the available network information;
  wherein the network characteristic determination module comprises: a standard and frequency band determination unit adapted for determining network standards supported by the CP and frequency bands corresponding to the network standards;
  wherein the available network information comprises: available frequency points of the frequency bands corresponding to the network standards supported by the CP;
  wherein the network searching module comprises: a network searching unit adapted for performing frequency search on the frequency bands corresponding to the network standards supported by the CP, according to a predetermined network standard searching order; and
  wherein the searching result determination module comprises:
  a first result determination unit adapted for, when obtaining the network searching instruction transmitted from the AP, if there is a frequency band being searched, determining available frequency points, which are obtained by the CP and are corresponding to the frequency band being searched, as a frequency point searching result of the frequency band being searched;
  a second result determination unit adapted for, if there is a frequency band being partly searched, combining partial available frequency point information which is obtained by the CP and is corresponding to the frequency band being partly searched, with frequency point information which is prestored in the terminal equipment and is corresponding to the frequency band being partly searched, so as to obtain combined frequency point information; and determining the combined frequency point information as a frequency point searching result of the frequency band being partly searched; and
  a third result determination unit adapted for, if there is a frequency band being unsearched, determining frequency point information which is prestored in the terminal equipment and is corresponding to the frequency band unsearched as a frequency point searching result of the frequency band being unsearched.

5. The CP according to claim 4, wherein the device for searching network at startup further comprises: a network registration module adapted for performing network registration according to the network searching result;
  wherein the network registration module comprises:
  a cell searching unit adapted for, performing cell search for any network standard supported by the CP, by using the frequency point searching result of the frequency band being searched and/or the frequency point searching result of the frequency band being partly searched;
  a continual frequency searching unit adapted for, if no cell is found and there are unsearched frequency bands and/or frequency bands being partly searched under the network standard, performing frequency search on the unsearched frequency bands and/or the frequency bands being partly searched, so as to perform cell search according to frequency points obtained by the frequency search; and
  a next-step searching unit adapted for, if no cell is found and there are no unsearched frequency bands and/or frequency bands being partly searched under the network standard, performing cell search under next network standard.

6. A terminal equipment comprising: an Application Processor (AP) and a Communication Processor (CP), wherein the CP comprises:
  a network characteristic determination module adapted for, after the CP is powered on and initialized, determining characteristic information of networks supported by the CP;
  a network searching module adapted for searching for available networks according to the network characteristic information, and obtaining available network information; and
  a searching result determination module adapted for obtaining a network searching instruction transmitted from an Application Processor (AP), and determining a network searching result according to the available network information;
  wherein the network characteristic determination module comprises: a standard and frequency band determination unit adapted for determining network standards supported by the CP and frequency bands corresponding to the network standards;
  wherein the available network information comprises: available frequency points of the frequency bands corresponding to the network standards supported by the CP;
  wherein the network searching module comprises: a network searching unit adapted for performing frequency search on the frequency bands corresponding to the network standards supported by the CP, according to a predetermined network standard searching order; and
  wherein the searching result determination module comprises:
  a first result determination unit adapted for, when obtaining the network searching instruction transmitted from the AP, if there is a frequency band being searched, determining available frequency points, which are obtained by the CP and are corresponding to the frequency band being searched, as a frequency point searching result of the frequency band being searched;
  a second result determination unit adapted for, if there is a frequency band being partly searched, combining partial available frequency point information which is obtained by the CP and is corresponding to the frequency band being partly searched, with frequency point information which is prestored in the terminal equipment and is corresponding to the frequency band being partly searched, so as to obtain combined frequency point information; and determining the combined frequency point information as a frequency point searching result of the frequency band being partly searched; and a third result determination unit adapted for, if there is a frequency band being unsearched, determining frequency point information which is prestored in the terminal equipment and is corresponding to the frequency band being unsearched as a frequency point searching result of the frequency band being unsearched.

7. The terminal equipment according to claim 6, further comprises: a network registration module adapted for performing network registration according to the network searching result;

wherein the network registration module comprises:

a cell searching unit adapted for, performing cell search for any network standard supported by the CP, by using the frequency point searching result of the frequency band being searched and/or the frequency point searching result of the frequency band being partly searched;

a continual frequency searching unit adapted for, if no cell is found and there are unsearched frequency bands and/or frequency bands being partly searched under the network standard, performing frequency search on the unsearched frequency bands and/or the frequency bands being partly searched, so as to perform cell search according to frequency points obtained by the frequency search; and a next-step searching unit adapted for, if no cell is found and there are no unsearched frequency bands and/or frequency bands being partly searched under the network standard, performing cell search under next network standard.

* * * * *